Nov. 11, 1969  R. B. HARTMAN  3,477,403
OXYLUMINESCENT CONTROL APPARATUS
Filed April 7, 1967  2 Sheets-Sheet 1
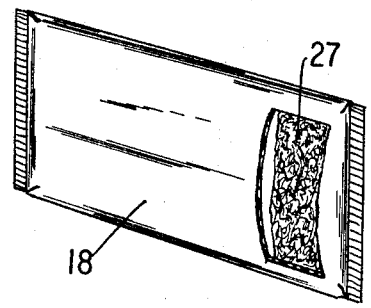
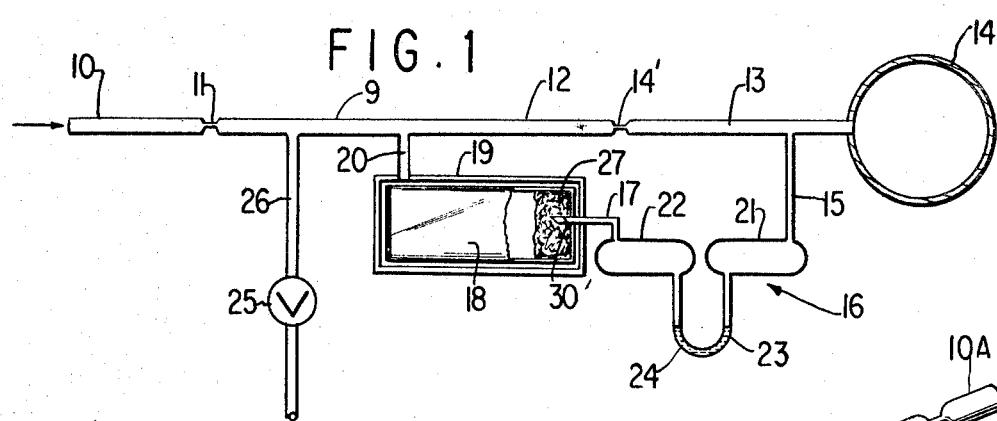
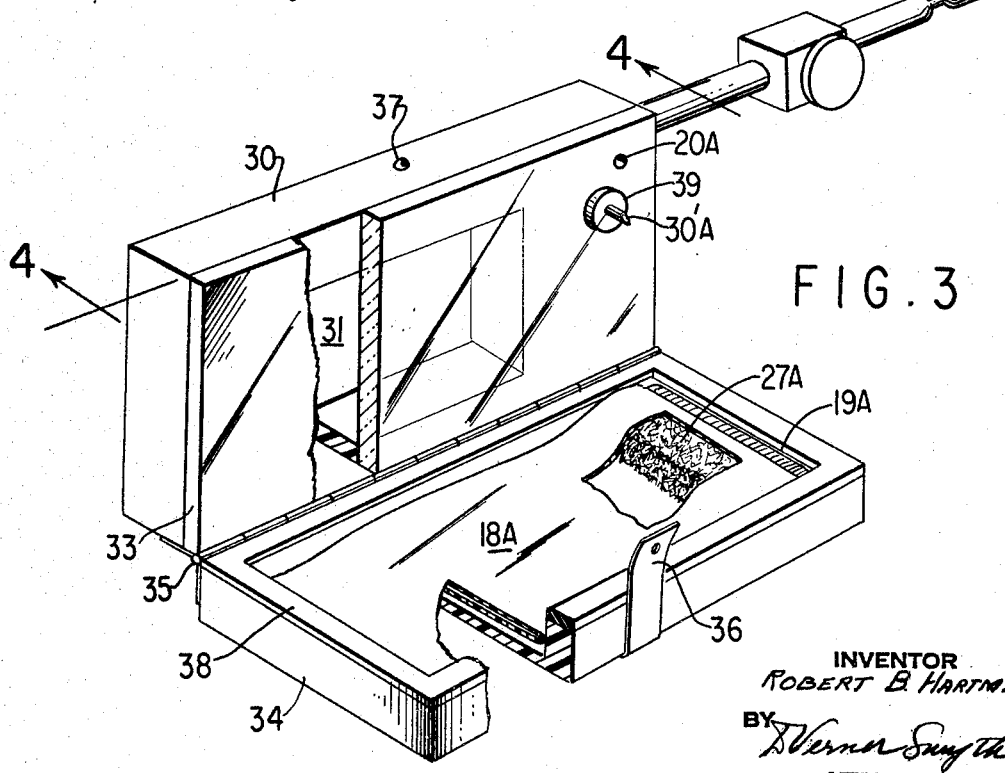
INVENTOR
ROBERT B. HARTMAN
BY
ATTORNEY Nov. 11, 1969  R. B. HARTMAN  3,477,403
OXYLUMINESCENT CONTROL APPARATUS
Filed April 7, 1967  2 Sheets-Sheet 2

INVENTOR
ROBERT B. HARTMAN
BY
D. Verner Smythe
ATTORNEY

United States Patent Office 3,477,403
Patented Nov. 11, 1969

3,477,403
OXYLUMINESCENT CONTROL APPARATUS
Robert B. Hartman, Bridgeport, Conn., assignor to Remington Arms Company, Inc., Bridgeport, Conn., a corporation of Delaware
Filed Apr. 7, 1967, Ser. No. 629,253
Int. Cl. G01d 21/00
U.S. Cl. 116—114                                                                      8 Claims

ABSTRACT OF THE DISCLOSURE

An apparatus for separating and controlling flow of gas from and into a flexible chamber with the use of a liquid filled U-tube trap. The flexible chamber can have an oxyluminescent material therein which will produce light when the gas reaches it.

---

This invention relates to a fluid flow control apparatus and particularly to one which will permit an activating chemical agent or gas to come into contact with a chemiluminescent material.

In conjunction with activation of oxyluminescent material, which is a substance that will give out light when subjected to oxygen-containing gas, it is desirable to be able to admit and to remove the oxygen-containing gas from contact with the material.

One of the objects of the invention is to provide a simple means for controlling flow of gas to and from a material actuatable thereby.

In one aspect of the invention, a chamber having a flexible wall can be enclosed in another chamber, there being one supply of fluid, such as gas, to one side of the first chamber. A second supply of fluid, such as gas, is connected to the interior of the flexible chamber through a trap which has liquid therein. In a preferred form, the second supply of fluid or pressure receives fluid from the first through a conduit with a resistance or fluidic diode therein. The resistance, such as a restriction in the conduit or passage or diode, is made such that substantially the same pressure will ultimately be furnished to both sides of the flexible chamber. Upon reduction at a rapid rate of the first supply pressure, the second supply chamber will reduce pressure at a slower rate due to the restriction or diode, and the resistance of the trap will be overcome by the pressure differential so that some fluid or gas in the second chamber will pass into the interior of the flexible chamber.

In a further aspect of the invention, the flexible chamber can have a chemiluminescent or oxyluminescent substance therein which will emit light upon being subjected to air or oxygen-containing gas. Such a material or substance is described in U.S. Patent No. 3,239,406. By use thereof, upon a sudden reduction in pressure, such as by manual control, or bursting of the first supply pipe, air will be furnished to the substance to provide light. As an example, such might be extremely useful in conjunction with emergency signs or lights in an airplane, the signs or lights being formed from or by the chamber with the chemiluminescent material therein.

In one form, the various parts can be made of molded plastic. The flexible chamber or bag can have a piece of porous form retaining material for receiving the end of an insertable hollow needle to connect the interior of the bag to the trap.

These and other objects, features and advantages of the device will become apparent from the following description and drawings which are merely exemplary.

In the drawings:

FIG. 1 is a schematic view of the invention;

FIG. 2 is a perspective view of a flexible bag with oxyluminescent material therein;

FIG. 3 is a perspective view of one form of the invention with the cover open;

Figure 4:
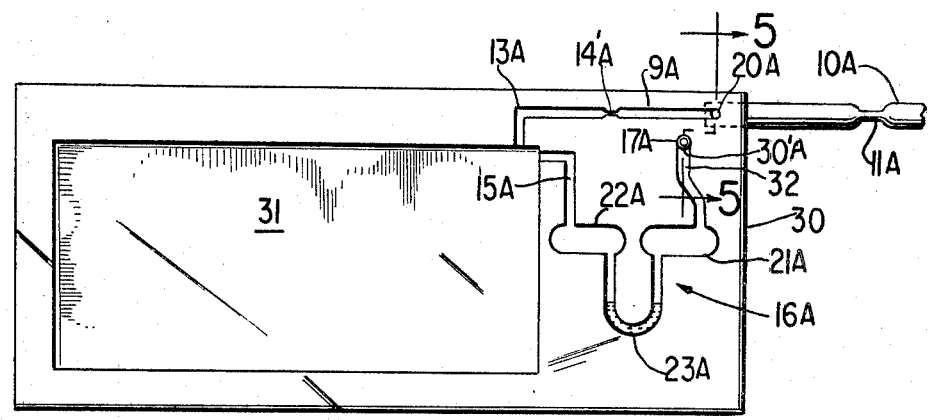
FIG. 4 is a view along the line 4—4 of FIG. 3.

Referring to FIG. 1, a first fluid or gas supply is connected to conduit or pipe 10, there being a restricted portion 11. Conduit 10 has a connection 9, 12 to an accumulator 14 through resistance or restriction 14'. A restriction may be used or conduit 12 and 13 may be sized relative to restriction 11, conduit 9 and conduit 20 to provide the required resistance. Accumulator 14 also could be a separate source of pressure. Conduit 13 is connected by pipe 15 of unrestricting size to the trap 16 which in turn is connected by pipe 17 to the interior of bag or flexible chamber 18. Flexible chamber 18 is enclosed in second chamber or enclosure 19 which is connected by pipe 20 of unrestricting size to conduit 9.

Trap 16 has enlarged portions or liquid receiving means 21 and 22 and has liquid 23 in U-shaped tube 24.

As an example, release valve 25 may be located in line 26 for releasing pressure in line 9, conduit 20 and the interior of chamber 19. The pressure could also be released in other manners such as by breaking of line 26.

The flexible bag can have an oxyluminescent material therein which is intended also to include chemiluminescent materials. The porous form retaining sponge 27 is in the interior to receive the end of needle 30' which provides a connection from the line 17 to the interior of bag 18. The needle permits easy replacement of the flexible bag 18 as will become apparent hereafter, while the sponge 27 provides sufficient resistance to insure that the needle penetrates the front face of the bag 18 and sufficient thickness to insure that the back face of the bag 18 will not be pierced.

Describing operation of the device or system, as pressure is supplied to 10, the fluid or supply air will flow into accumulator 14. Simultaneously, supply air will flow at a faster rate into chamber 19 than into accumulator 14 since restriction 14' is included and slows the flow into accumulator 14. The pressure on the inside of chamber 19 being initially higher than source 14 will tend to squeeze any residual gas in flexible bag 18 through trap 16 into accumulator 14. When pressure equilibrium is reached, the liquid column 23 prevents flow or migration of the gas from accumulator 14 into bag 18.

Upon a rapid reduction in pressure in line 9 or 26, and therefore chamber 19, the pressure in accumulator 14, which will be higher due to restriction 14', will cause displacement of liquid 23 into enlarged portion 22. When this occurs, the gas from source 14 can enter flexible bag 18 until the pressure in the chambers is equalized and activate the material therein as for an emergency sign or light without liquid passing into bag 18.

On re-application of pressure at pipe 9 as by closing valve 25, pressure builds up first in chamber 19 if restriction 14' is included, squeezing the gas in flexible bag 18 back through the liquid trap 16 and into accumulator 14 after displacing the liquid 23 into the enlarged portion 21. The removal of most of the gas from bag 18 stops the chemical reaction as soon as the residual gas has been consumed and therefore extinguishes the chemiluminescence which has been used as an emergenecy light or sign illuminator. When equilibrium is reached between chambers 19, 18 and 14, the liquid 23 provides a migration seal between chamber 14 and bag 18.

Restriction 11 will prevent continuous pressure applied at supply 10 from overcoming the result of opening valve 25 or bleed-off from line 26.

Figure 5:
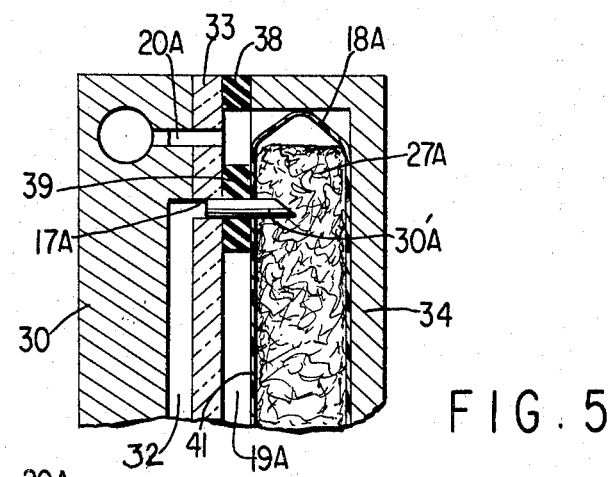
FIG. 5 is a fragmentary enlarged sectional view along line 5—5 of FIG. 4.

One form of construction is seen in FIGS. 3 to 5, inclusive. Back plate 30 has chamber 31 therein which corresponds to accumulator 14 of FIG. 1. The other parts will be given the same numbers as corresponding parts in FIG. 1 with the suffix A. Back plate 30 may be of a suitable plastic such as nylon or "Lucite," the trademark of Du Pont for its methyl methacrylate, and may have the various conduits formed therein.

Supply 10A is connected to chamber 31 by line 9A through resistance 14'A. Trap 16A is connected between chamber 31 and line 32 leading to needle 30'A.

Cover plate 33 (FIGS. 3, 5) can be suitably fastened to the face of back plate 30 by an adhesive to provide a gas-tight closure. The enclosure or chamber 19A is located in a plate 34 which is mounted on back plate 30 and cover plate 33 by hinge 35. Latch 36 is engageable with pin 37 to hold the parts in closed sealed relation. The front plate 34 can be of a transparent material or can at least be transparent in portions thereof so that transparent flexible bag 18A can be viewed therein.

Gasket 38 between cover plate 33 and front plate 34 has been found desirable as well as gasket 39 around needle 30'A. Needle 30'A may be made from a hypodermic needle. Porous semi-rigid material 27A can be of a metallic wood type structure, which supports the bag to permit piercing one side and prevents the needle from piercing both sides of bag 18A.

As the front plate 34 is closed, needle 30'A will penetrate through the side 41 of plastic envelope 18A (FIG. 5) so as to connect line 17A with the interior of the flexible bag 18A. The porous material will separate the sides of the bag so that the opening of the needle will be located at the proper place therein and will not pierce the opposite side.

Figure 6:
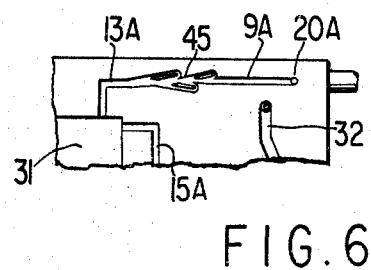
FIG. 6 is a fragmentary view of FIG. 4 showing another form.

In FIG. 6, the resistance 14'A of FIG. 4 is replaced by diode 45 which may be of the type illustrated in Patent 1,329,559. In such an arrangement, the pressure will build up substantially simultaneously in the chmaber 31 and in enclosure 19A through the forward low resistance of diode 45 into chamber 31 and through channel 20A into enclosure 19A. Such will produce equal pressures on both sides of the liquid trap and will not disturb the fluid present in flexible chamber 18A other than to increase its pressure by the same amount. When the system is activated, as by operating valve 25, the system will operate as previously described due to the reverse characteristic of the diode acting as a resistance to flow from chamber 31.

It should be apparent that changes can be made in the various details of construction without departing from the spirit of the invention.

What is claimed is:

1. In a fluid control means for controlling flow to a chamber means having at least one flexible wall, the combination including an enclosure means for said chamber means, means for connecting a first fluid supply source to said enclosure means, means for connecting a second fluid supply source to said chamber means and a liquid trap in the connection of said second source to said chamber, the resistance of said liquid trap to flow of fluid being made such that when the pressure of said first source in said enclosure means is changed sufficiently relative to said second source, the resistance of said trap will be overcome and fluid from said second source will flow into said chamber means.

2. A control means according to claim 1 wherein said chamber means has oxyluminescent material therein, the fluid from said second source including oxygen for activating said material.

3. A control means according to claim 1 wherein the trap is U-shaped with liquid therein and there is a liquid trap at the ends of the U to permit fluid to flow but to trap the liquid of the trap therein.

4. A control means according to claim 1 wherein the second source is connected to said first source through a fluidic diode means that will permit flow from said first source to said second source but will inhibit flow in the opposite direction.

5. A control means according to claim 1 wherein the second source is connected to said first source through a resistance means that will permit pressure reduction in said enclosure means faster than pressure reduction in said second source.

6. A control means according to claim 5 wherein when pressure is restored in said enclosure means, fluid will flow from said chamber means back to said second source.

7. A control means according to claim 6 wherein the chamber means is a flexible envelope with a chemiluminescent material therein, the fluid from said second source including the chemical agent for activating said chemiluminescent material.

8. A control means according to claim 7 wherein the flexible means is replaceable.

References Cited

UNITED STATES PATENTS

| | | | |
|---|---|---|---|
| 1,329,559 | 2/1920 | Tesla | 138—37 X |
| 3,140,726 | 7/1964 | Arenhold | 137—557 |
| 3,189,078 | 6/1965 | Davidson | 137—169 X |
| 3,350,553 | 6/1965 | Cline | 240—2.25 |
| 3,354,828 | 11/1967 | Shefler et al. | 240—2.25 X |

LOUIS R. PRINCE, Primary Examiner

DANIEL M. YASICH, Assistant Examiner

U.S. Cl. X.R.

23—253; 137—251; 250—71

PO-1050
(5/69)

UNITED STATES PATENT OFFICE
CERTIFICATE OF CORRECTION

Patent No. 3,477,403          Dated November 11, 1969

Inventor(s) Robert B. Hartman

It is certified that error appears in the above-identified patent and that said Letters Patent are hereby corrected as shown below:

Column 2, line 65, "emergenecy" should be --emergency--; Column 3, line 25, "wood" should be --wool--; Column 3, line 37, "pressure" should be --pressures--; Column 3, line 38, "chmaber" should be --chamber--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents